US007289640B2

(12) United States Patent
Tsai et al.

(10) Patent No.: US 7,289,640 B2
(45) Date of Patent: Oct. 30, 2007

(54) ADJUSTABLE BLUETOOTH WIRELESS EARPHONE

(75) Inventors: Liang-Tan Tsai, Taipei (TW);
Chung-Cheng Liao, Taipei (TW);
Pei-Yu Lu, Taipei (TW)

(73) Assignee: Global Target Enterprise, Inc., Taipei (TW)

( * ) Notice: Subject to any disclaimer, the term of this patent is extended or adjusted under 35 U.S.C. 154(b) by 520 days.

(21) Appl. No.: 10/865,750

(22) Filed: Jun. 14, 2004

(65) Prior Publication Data

US 2005/0208980 A1  Sep. 22, 2005

(30) Foreign Application Priority Data

Mar. 22, 2004  (TW) .............................. 93204293 U

(51) Int. Cl.
*H04R 25/00* (2006.01)
(52) U.S. Cl. ...................... 381/380; 381/370; 381/374; 379/430
(58) Field of Classification Search ................. 381/309, 381/328, 330, 370, 371, 375, 376, 380–382; 379/428.01, 428.02, 430, 433.02; 455/575.2, 455/569.1; 181/129, 130, 135
See application file for complete search history.

(56) References Cited

U.S. PATENT DOCUMENTS

| 6,741,719 B1 * | 5/2004 | Orten ......................... 381/380 |
| 6,760,459 B2 * | 7/2004 | Bae ............................ 381/375 |
| 6,819,762 B2 * | 11/2004 | Jones et al. ................. 379/430 |

* cited by examiner

*Primary Examiner*—Huyen Le
(74) *Attorney, Agent, or Firm*—Rosenberg, Klein & Lee

(57) ABSTRACT

An adjustable Bluetooth wireless earphone primarily comprises an earphone body pin-connecting with a link-part at the front upper portion thereof so that the earphone can be rotated in all direction using the link-part as an axis and the link-part connects with a plug-set. The plug-set can co-move with the link-part. When the plug-set plugged the ear of the user, using the feature that the earphone body can be rotated in all direction, so the earphone body can be pressed close to the cheek portion of the user to form an angle between the earphone body and the plug-set, such that the plugged plug-set may stay more tightly on the ear of the user and not drop off easily.

1 Claim, 6 Drawing Sheets

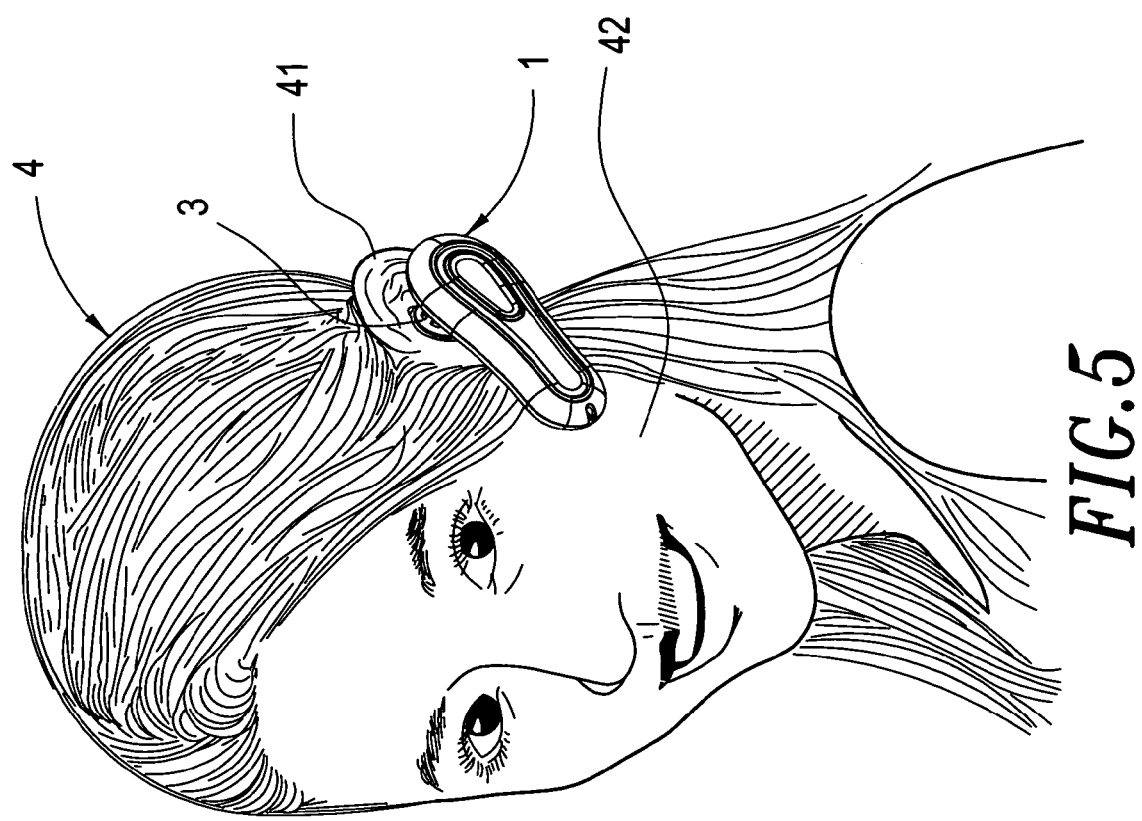

ADJUSTABLE BLUETOOTH WIRELESS EARPHONE

BACKGROUND OF THE INVENTION

1. Field of the Invention

The present invention relates to an adjustable wireless earphone, and particularly to an adjustable wireless earphone which the earphone body thereof can be rotated in all direction so that the plug-set thereof may tightly plug the ear of the user and not easily drop out from the ear.

2. Description of the Prior Art

In order to reduce the rising incidence of traffic accidents due to handholding a mobile phone while driving, many countries has established relevant regulations to strictly forbid any driver communicating by a handheld mobile phone with others during driving to reduce the traffic incidence effectively. Therefore, currently, among many products emerging to match up such government regulations, the most common product is a hand-free kit for mobile phone with a function which the driver places the mobile phone in the seat of the hand-free kit before driving, so the speaker of the kit or the speaker system in the car will broadcast the communication message once a call inbounds. This practice can enable the driver to communicate with others without hand-holding a mobile phone. Since the hand-free kit is associated with the build-in speaker in the car, this may generate too much noise or echo when the driver communicating with others, such that the inbound message can not be received clearly and there is no privacy if any other passenger present. Therefore, such a hand-free kit is not designed properly.

For solving the disadvantage derived from the hand-free kit, now there are over-ear and headset wireless earphones available in the market, it may put on the ear or the head of the user, without the fault of generating too much echoes and exposing the content of the communication while the driver communicating with others. But, the commercial available over-ear or headset wireless earphone usually is die-cast with the wireless principal body, thus there is no way to adjust the angle of the earphone appropriately according to the shape of the ear or the head of the user, this makes the wearing user feeling uncomfortable.

Thus, it can be seen that the above-described conventional articles still have many drawbacks. They are not designed properly, and need to be improved urgently.

In view of the disadvantages derived from the above-described conventional earphone, the inventor had devoted to improve and innovate, and after studying intensively for many years, successfully developed this adjustable Bluetooth wireless earphone according to the present invention finally.

SUMMARY OF THE INVENTION

The object of the present invention is to provide an adjustable Bluetooth wireless earphone wherein the angle thereof can be adjusted in all direction.

The another object of the present invention is to provide an adjustable Bluetooth wireless earphone wherein the plug-set thereof can tightly plug the ear of the user and not easily drop out from the ear.

The further object of the present invention is to provide an adjustable Bluetooth wireless earphone that has many advantages including: simple structure, easy assembling, convenient operation, etc.

The adjustable Bluetooth wireless earphone capable of achieving the above-mentioned objects comprises an earphone body, a link-part, and a plug-set, wherein the front upper portion of the earphone body has a extended flange which makes the corresponding back thereof forms a concave portion, the rim of the concave portion is rounded with a guide-piece and a hole in the flange; the rear end of the link-part has a pin-connecting portion and the front end thereof extends horizontally a position-piece, the position-piece at the front end of the link-part passes through the hole of the body such that the pin-connecting portion at the rear end pin-connects with the concave portion and contacts with the guide-piece of the concave portion so the link-part can be positioned, thus the angle of the earphone body can be adjusted in all direction using the link-part as an axis; the bottom of the plug-set has a concave hole, a guide-trough in the concave hole matches the shape of the front end of the link-part; the guide-trough at the bottom of the plug-set fits with the front portion of the link-part, so the position-piece at the front end of the link-part enters the plug-set and after the plug-set is rotated with a certain angle so as to enable the position-piece combining with the inner wall surface of the concave hole of the plug-set tightly such that the plug-set and the link-part can co-move and the concave hole can entirely cover the flange at the top surface of the body to unite the plug-set and the body as a whole; when the plug-set plugs the ear of the user, since the earphone body has a feature that can be rotated in all direction, the earphone body can be pressed close to the cheek portion of the user to form an angle between the earphone body and the plug-set such that the plug-set can stay on the ear of the user more tightly and not drop out easily, and the user can listen in the voice smoothly.

These features and advantages of the present invention will be fully understood and appreciated from the following detailed description of the accompanying Drawings.

BRIEF DESCRIPTION OF THE DRAWINGS

FIG. 5 shows the implementation schematic diagram of an adjustable Bluetooth wireless earphone according to the present invention.

DETAILED DESCRIPTION OF THE PREFERRED EMBODIMENT

Figure 1:
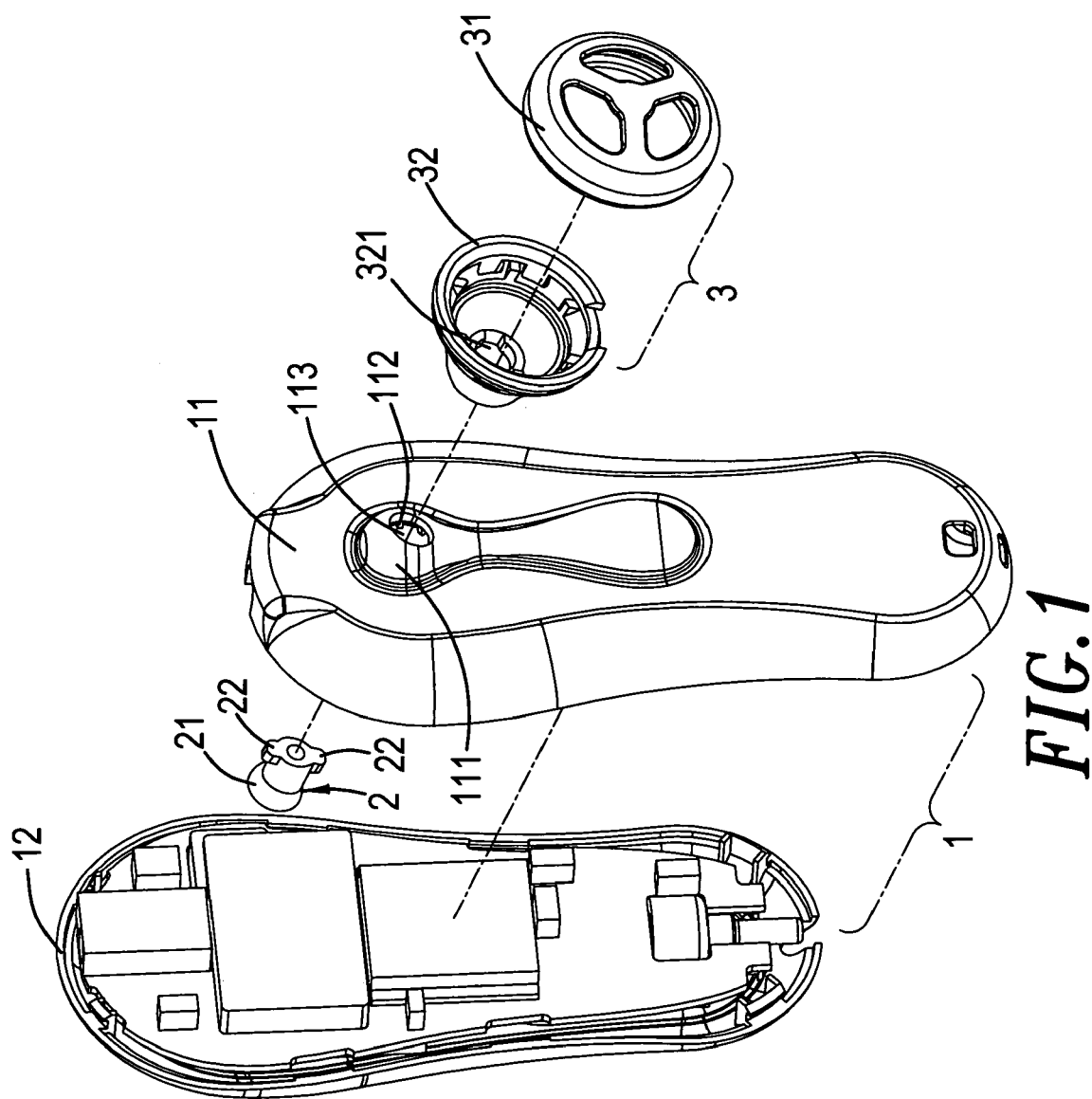
FIG. 1 shows the break-down schematic diagram of an adjustable Bluetooth wireless earphone according to the present invention.
Figure 2:
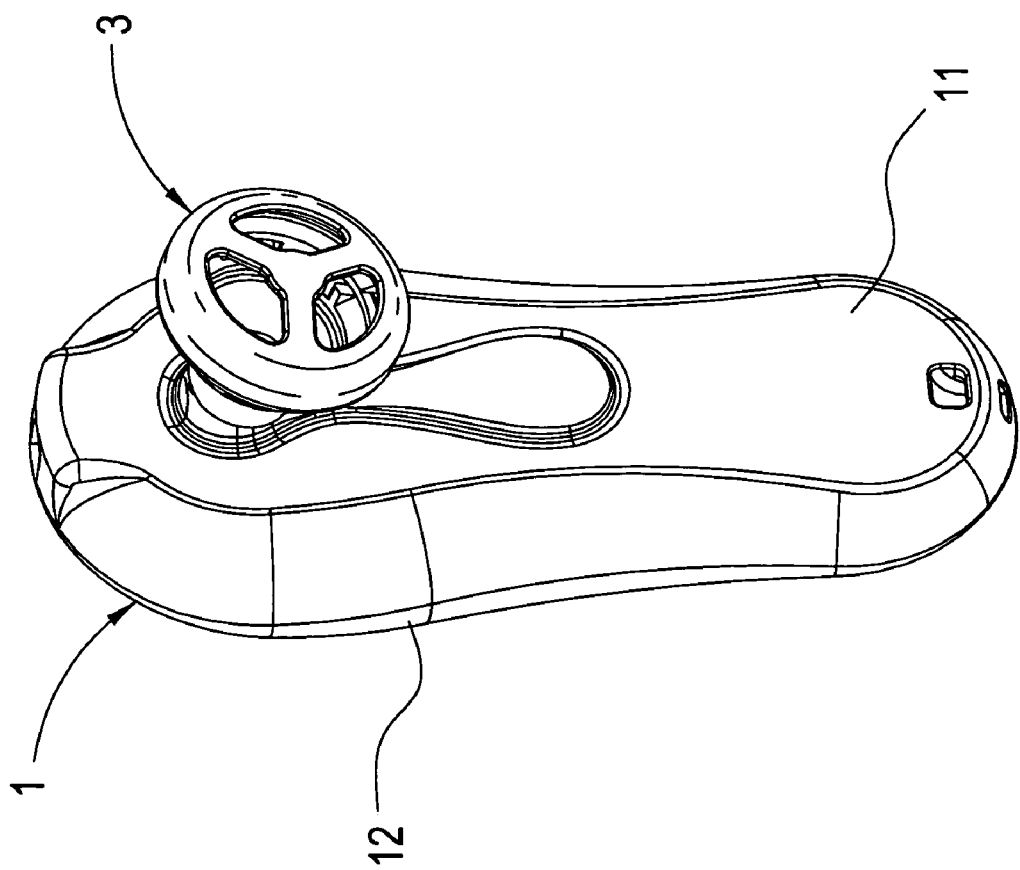
FIG. 2 shows the pictorial schematic diagram of an adjustable Bluetooth wireless earphone according to the present invention.
Figure 3:
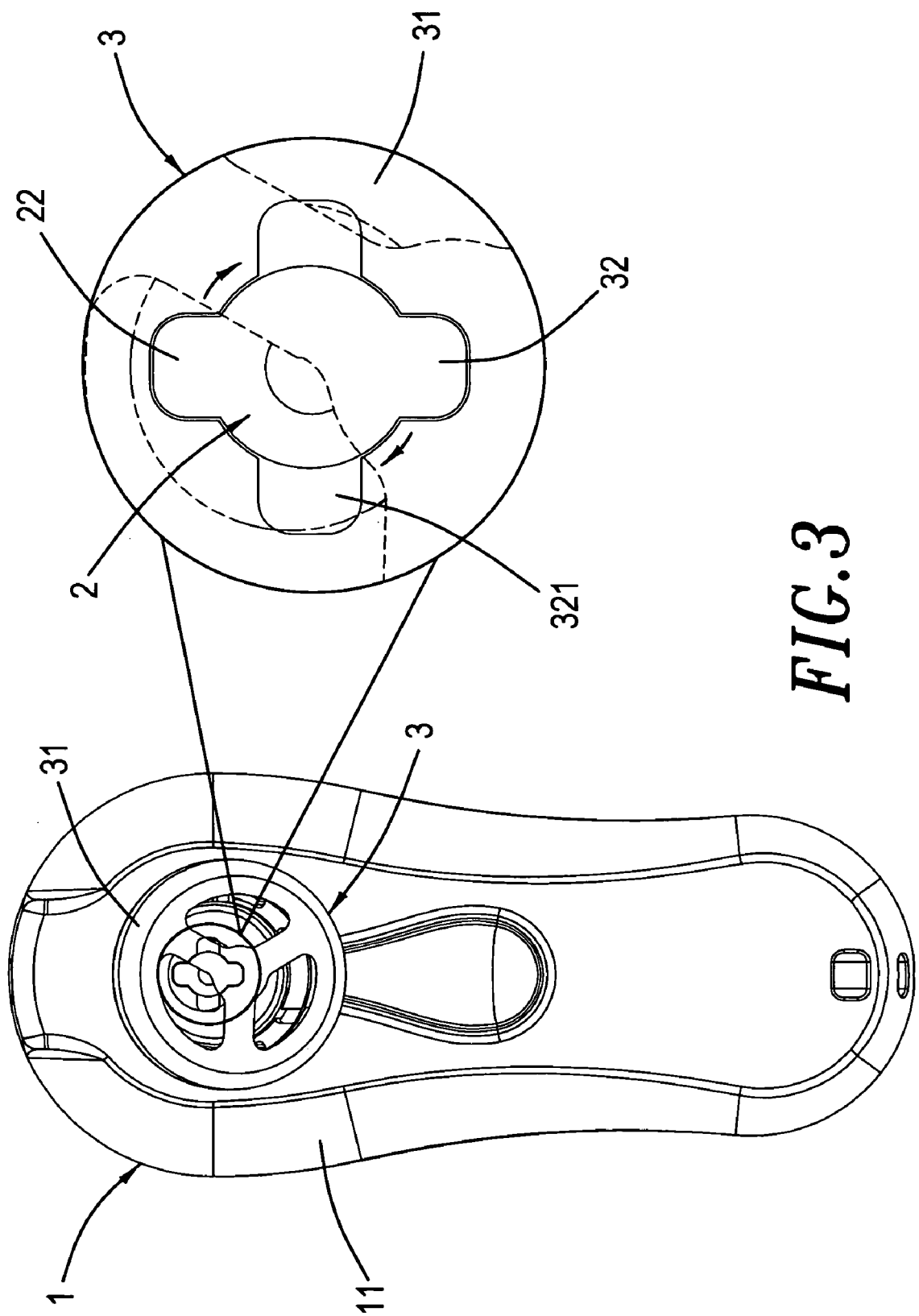
FIG. 3 is a schematic diagram shows the combination of the link-part and the plug-set of an adjustable Bluetooth wireless earphone according to the present invention.

Please refer to FIG. 1-3, an adjustable Bluetooth wireless earphone provided by the present invention mainly comprising:

An earphone body 1, the earphone body 1 is assembled by a front and a rear housing body 11, 12, a flange 111 extruded from the front upper portion of the front housing body 11 forms a corresponding concave portion in the back thereof (not shown), the rim of the concave portion is rounded with a guide-piece 112, and a hole 113 is punched on the flange 111;

A link-part 2, having a pin-connecting portion 21 at the rear end of the link-part 2, the surface of the pin-connecting portion 21 can be spherical, and having a position-piece 22 extending horizontally from each side of the front end of the link-part 2; the position-piece 22 at the front end of the link-part 2 passing from the back of the front housing body 11 of the earphone body 1 through the hole 113 such that the position-piece 22 of the link-part 2 extrudes from the hole 113 of the flange of the front housing body 11, and the pin-connecting portion 21 at the rear of the link-part 2 pin-connects with the concave portion in the back of the front housing body 11, and the spherical surface of the link-part 2 contacts with the guide-piece 112 of the concave portion, so that the link-part 2 can be positioned, and the earphone body 1 using the pin-connecting portion 21 of the link-part 2 as an axis and assisted by the guide-piece 112, thus the angle thereof can be adjusted in all direction including: rotated in 360 degree and turned upward, downward, leftward, and rightward;

A plug-set 3, the plug-set 3 comprising a base 32 and a cover 31, and the cover 31 lays over the top surface of the base 32 to cover the base 32, the bottom of the base 32 has a concave hole (not shown), the concave hole has a guide-trough 321 matching the shape of the front end of the link-part 2; the guide-trough 321 at the bottom of the base 32 of the plug-set 3 fits with the front portion of the link-part 2 so that the position-piece 22 at the front of the link-part 2 can enter the base 32 via the guiding of the guide-trough 321 and then the base 32 is rotated with a degree so that the position-piece 22 tightly fits with the inner surface of concave hole of the base 32, and the concave hole can fully cover the flange 111 on the top surface of the body 1, thus the plug-set 3 can co-move with the link-part 2 and unite with the body 1 as a whole.

Figure 4A:
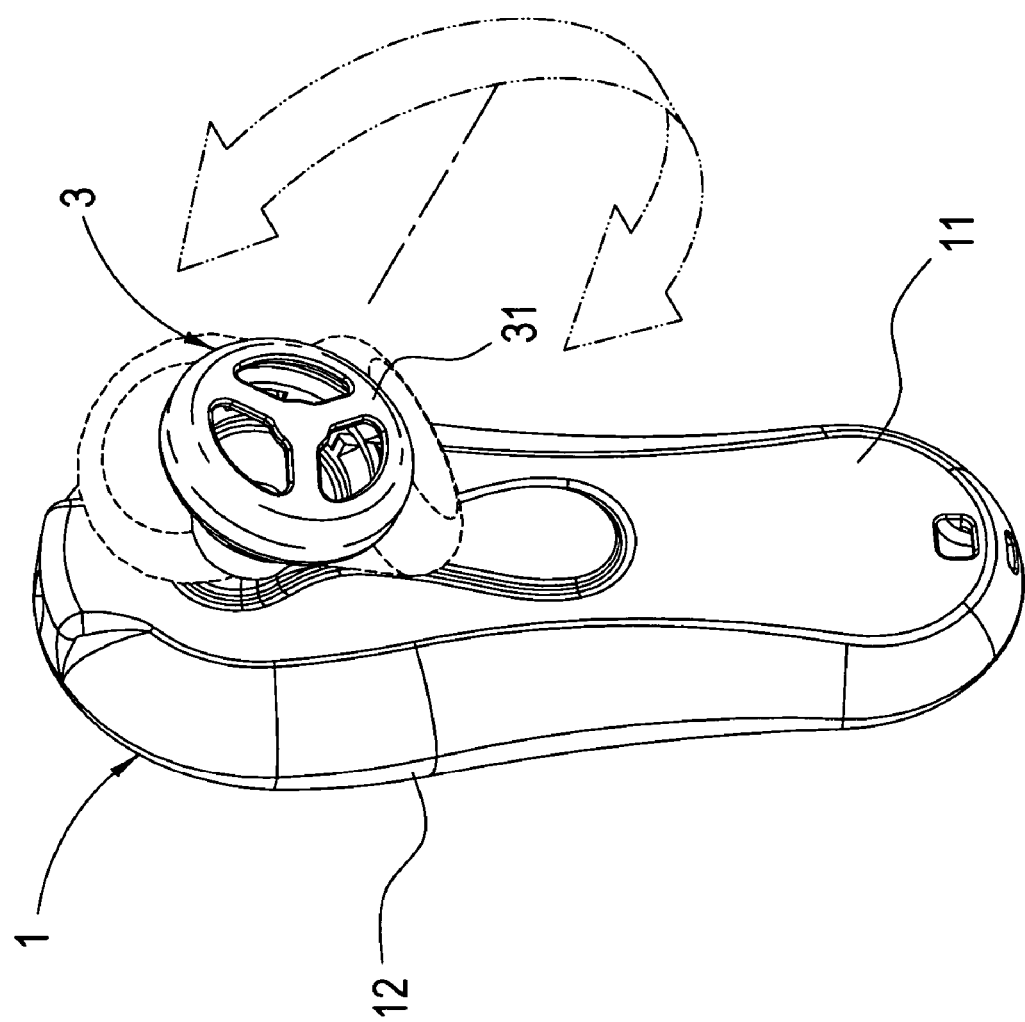
FIGS. 4A and 4B are the action schematic diagram of an adjustable Bluetooth wireless earphone according to the present invention.
Figure 4B:
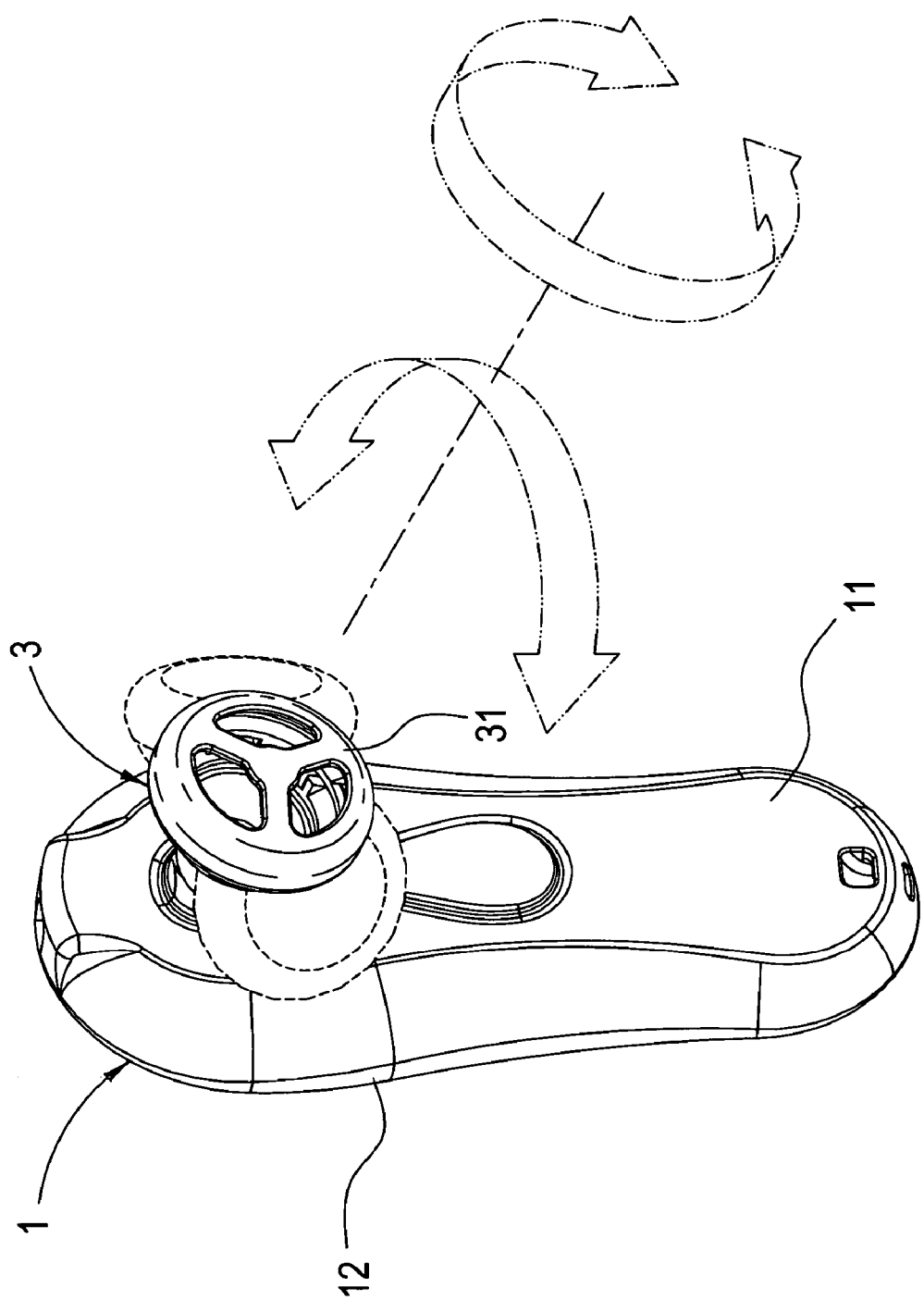

FIGS. 4A and 4B are an action and an implementation schematic diagrams according to the present invention respectively. While the user 4 wants to use the earphone body 1, the plug-set 3 plugs the ear 41 of the user 4 to position the plug-set 3 and the link-part 2. Now, using the feature that the angle of the earphone body 1 can be rotated in 360° and adjusted upward, downward, leftward, rightward, so the earphone body 1 can be pressed according to the shape of the cheek 42 of the user 4 close to the cheek 42 portion of the user 4 to form an angle between the earphone body 1 and the plug-set 3. As the angle formed, the plug-set 3 may stay more tightly on the ear 41 of the user 4 and not easily drop out, thus achieving the object that the user can listen in the voice smoothly.

As compared with other conventional techniques, the adjustable Bluetooth wireless earphone provided by the present invention has more following advantages including:

1. The present invention which the earphone body thereof is united with the plug-set thereof as a whole via a link-part, and the link-part is pin-connected with the earphone body, so that the earphone body can be adjusted in all direction using the link-part as an axis, thus the plug-set can plug the ear of the user tightly and not drop out easily.

2. The present invention has many advantages including: simple structure, easy operation, convenient assembly, etc.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An adjustable Bluetooth wireless earphone, comprising:

an earphone body having front and rear housings joined together, the front housing having a protruding portion with a concave inner surface and an opening formed therethrough;

a link-part extending through the opening and having a spherically shaped pin-connecting portion in contact with the concave inner surface of the protruding portion, the link-part having a pair of position pieces extending radially at a distal end thereof; and a plug-set having a base and a cover overlaying a top of the base, the base having a concave opening formed on a back side thereof with a guide trough formed therethrough and shaped in correspondence to the distal end of the link-part, the position pieces passing through the guide trough and the base being rotated relative to the link part to secure the plug-set to the earphone body through the link-part with the concave shaped opening of the base overlaying the protruding portion of the front housing, wherein the earphone body and the plug-set can be adjusted in all directions.

* * * * *